(12) United States Patent
Koenings

(10) Patent No.: US 6,386,220 B1
(45) Date of Patent: May 14, 2002

(54) SOLENOID OPERATED PRESSURE CONTROL VALVE

(75) Inventor: Anthony G. Koenings, Oakland, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/575,625

(22) Filed: May 22, 2000

(51) Int. Cl.⁷ .................... F15B 13/044; F16K 31/06
(52) U.S. Cl. .................. 137/15.21; 137/625.65; 251/129.08
(58) Field of Search ............... 137/625.65, 15, 137/21; 251/129.08

(56) References Cited

U.S. PATENT DOCUMENTS

| | | | |
|---|---|---|---|
| 5,607,137 A | 3/1997 | Kanda et al. | 251/129.07 |
| 5,853,028 A | 12/1998 | Ness et al. | 137/625.65 |

*Primary Examiner*—Gerald A. Michalsky
(74) *Attorney, Agent, or Firm*—Roger A. Johnston

(57) ABSTRACT

A solenoid operated pressure control valve of the type using a spool valve member for controlling flow from a source inlet to a control outlet port and to an exhaust port. The solenoid has a reduced area portion of the flux collector in magnetic loop forming an annular air gap remote from the working air gap. The reduced flux across the annular air gap compensates for the rapid flux increase as the working air gap closes.

13 Claims, 5 Drawing Sheets

SOLENOID OPERATED PRESSURE CONTROL VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to solenoid operated valves employed for controlling flow of pressurized hydraulic fluid to actuators in an hydraulic system in response to an electrical control signal, such as provided by a microcomputer. Solenoid operated pressure control valves are employed in a variety of applications; one such application being for the control of shifting clutch actuators in an automatic transmissions for motor vehicles.

Heretofore, electrically operated pressure control valves for controlling the shifting in an automatic transmission for a motor vehicle have employed a valving member configured as a spool with cylindrical valving lands provided thereon for controlling flow of hydraulic fluid between an inlet and a control or signal outlet port with pressure control provided by bleeding fluid through an exhaust outlet port which returns the flow to the source or sump.

In providing such an electrically operated pressure control valve for motor vehicle automatic transmission shift control, problems have been encountered in obtaining adequate pressure control over a wide range of flow required to provide the necessary shift actuator movement because of the magnetic characteristics of the actuating solenoid.

For a given level of solenoid electrical energization, the magnetic force on a typical solenoid armature varies non-linearly with respect to armature movement. As the armature reduces the working air gap with the stationary pole piece or flux collector, the magnetic force tends to increase exponentially thereby giving the resultant response of the valve spool connected to the armature undesirable valving characteristics. The exponential increase in the magnetic force causes prohibitively rapid opening and closing of the respective ports for given port and spool land configurations and thus renders proper control of the hydraulic pressure in the actuating circuit extremely difficult.

Accordingly, it has long been desired to provide a solenoid operated pressure control valve for controlling the flow of hydraulic fluid in an actuating circuit which provides a relatively long armature stroke with substantially linear response for a given level of solenoid energization and provides generally linear or proportional pressure control over the operating range of coil energization.

BRIEF SUMMARY OF THE INVENTION

The present invention addresses the above described problem and provides a solenoid operated pressure control valve of the type having a spool moveable in a valve body for controlling flow from an inlet to an control or signal outlet port and to a bleed port for maintaining pressure control. The spool of the valving member in the present invention has a pair of spaced lands for controlling flow respectively to the control and exhaust port in response to spool movement by the solenoid armature. The solenoid is constructed to provide reduced magnetic flux at one end of the armature as the working air gap on a remote end of the armature is closed by a given level at coil energization. The flux is decreased at the one end of the armature by a reduced area portion of the flux collector which surrounds the distal end of the armature forming an annular air gap therebetween. The decrease in flux at the remote end of the armature results in a substantially linear force versus stroke characteristics for the solenoid upon coil energization at a given level. The resultant pressure at the control pressure outlet is thus generally proportionally changed with respect to changing coil energization.

DETAILED DESCRIPTION OF THE INVENTION

Figure 1:
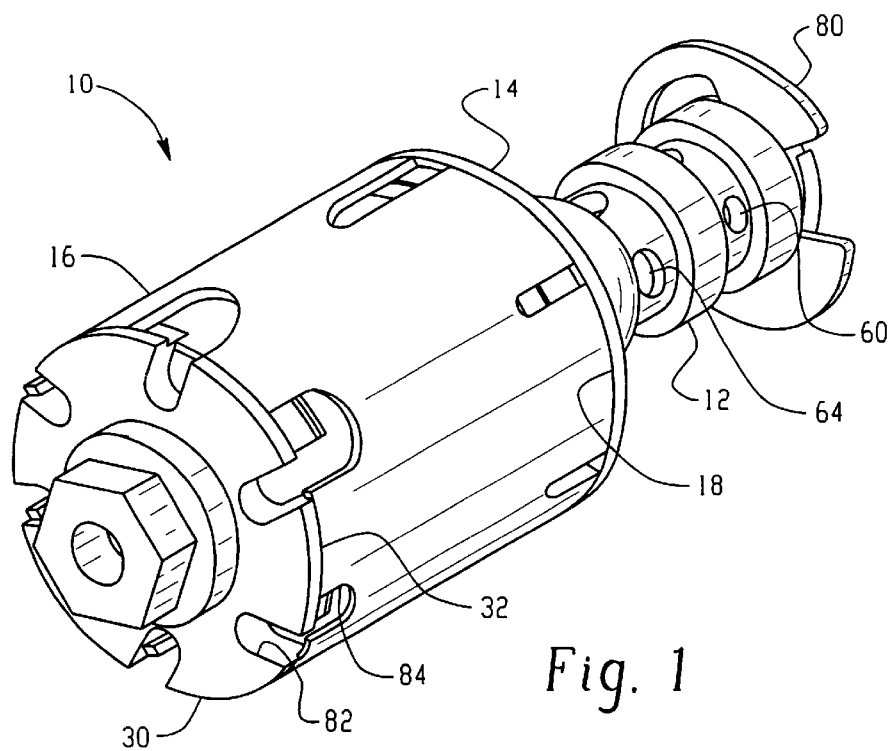
FIG. 1 is a perspective view of the valve assembly of the present invention taken from the solenoid end.

Referring to FIGS. 1 through 4, the valve assembly of the present invention is indicated generally at 10 and includes a valve body 12 attached to a base or mounting flux collector 14 which has received thereover and attached thereto one end of an outer flux member configured as cylindrical shell 16 and which is registered against shoulder 18 provided on the flux collector 14. Flux collector 14 has a reduced diameter annular portion 20 provided thereon and extending axially therefrom, the magnetic function of which will be hereinafter described.

Valve body 12 has a valving bore 22 formed therein into which is slidably received in closely fitting arrangement a spool member 24 having a pair of spaced cylindrical valving lands 26, 28 formed thereon which may be lapped into bore 22, if desired to provide the desired close fit.

Figure 3:
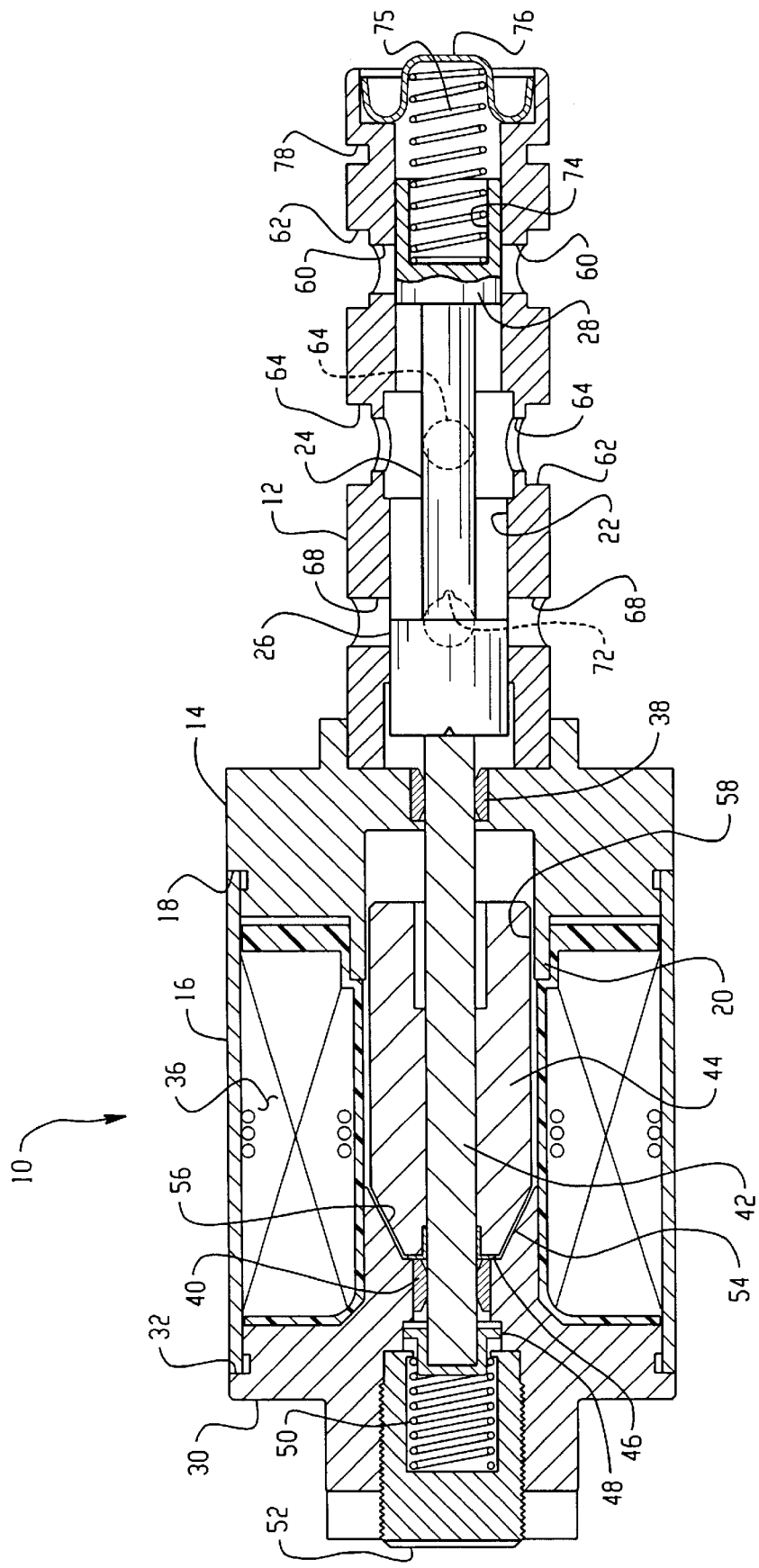
FIG. 3 is a cross-section of the valve assembly of FIG. 1.

Outer shell 16 has its opposite end connected to a second flux collector member 30 and registered against a shoulder 32 provided thereon. A coiled bobbin 34 is disposed within shell 16 and between the flux collectors 14, 30 and has an electrical coil 36 wound thereon as shown in FIG. 3.

Each of the flux collectors 14, 30 has a bearing respectively 38, 40 disposed therein; and, an operating rod 42 is slidably disposed in the bearings 38, 40. Operating rod 42 has an armature 44 received thereover. Stop washer 46 acts as a magnetic spacer between armature 44 and pole piece 30. A spring retainer 48 is received over the end of rod 42 and a spring 50 has one end registered against the retainer 48 with the opposite end registered against the undersurface of an adjustment plug 52 which is threadedly engaged in the flux collector 30.

Armature 44 has the end adjacent flux collector 30 tapered as indicated by reference numeral 54; and, flux collector 30 has a correspondingly configured tapered recess 56 formed therein which tapers 54, 56 define a working air gap between armature 44 and flux collector 30, a portion of which has an annular configuration.

In the present practice of the invention, it has been found satisfactory to taper the end 54 of the armature at an angle of twenty-two degrees (22°) to the coil axis.

Similarly, the inner periphery 54 of the reduced diameter portion 20 of flux collector 14 defines an annular air gap with the end of armature 44 distal the tapered end 54.

In the embodiment of FIGS. 1 through 4, the valve body 12 has an inlet port comprising apertures 60 formed adjacent the free end thereof in a collector ring 62; and, spaced along bore 22 is a control or signal pressure outlet comprising apertures 64 formed in a collector ring 66. Spaced further along bore 22 is an exhaust outlet comprising apertures 68. The inlet apertures 60 are located at a station along bore 22 such that valve land 28 is operable upon movement to control the flow through apertures 60 entering the valving bore 22 in the region intermediate lands 28, 26.

Valving land 26 is operative to control the bleed flow through exhaust apertures 68 from bore 22.

As shown in dashed outline in FIG. 3, the exhaust port apertures 68 include a feathering notch denoted by reference numeral 72 to permit a small amount of hydraulic fluid to be exhausted upon initial opening of the exhaust port; and, conversely to prevent a sudden rapid close off of the exhaust port upon closing.

The valve spool 24 is retained in bore 22 by a spring 74 registering on one end thereof against a recess 76 formed in the end of land 28; and, at its opposite end the spring is retained by a cap 76 pressed in the end of valve body 12.

A groove 78 is provided near the end of valve body 12 and has received therein a snap ring 80 which it will be understood is employed for retaining the valve body in a bore (not shown) in the hydraulic circuit of the device to be controlled.

Figure 5:
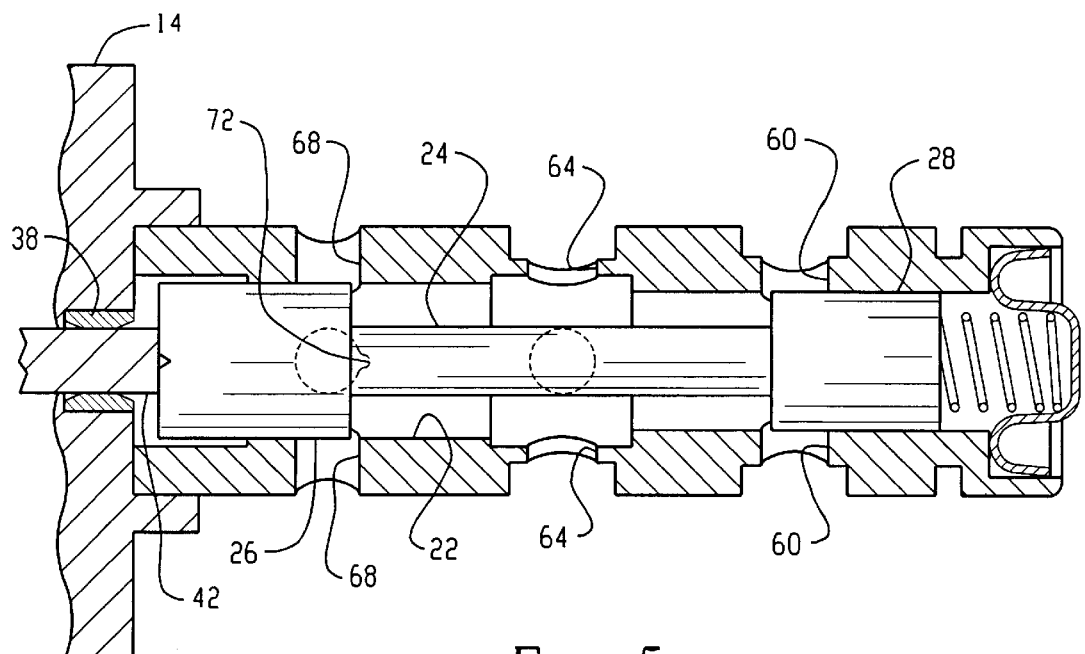
FIG. 5 is a portion of a cross-section similar to FIG. 3 showing the valve spool in a low flow position.

Referring to FIG. 5, the spool 24 is shown in a low flow position where valving land 26 has only opened the feathering notch portion 72 of port 68; and, land 28 is positioned to permit only a small amount of flow through inlet port 60 to the bore 22; and, therefore the pressure in control port 64 is maintained at a low level.

Figure 6:
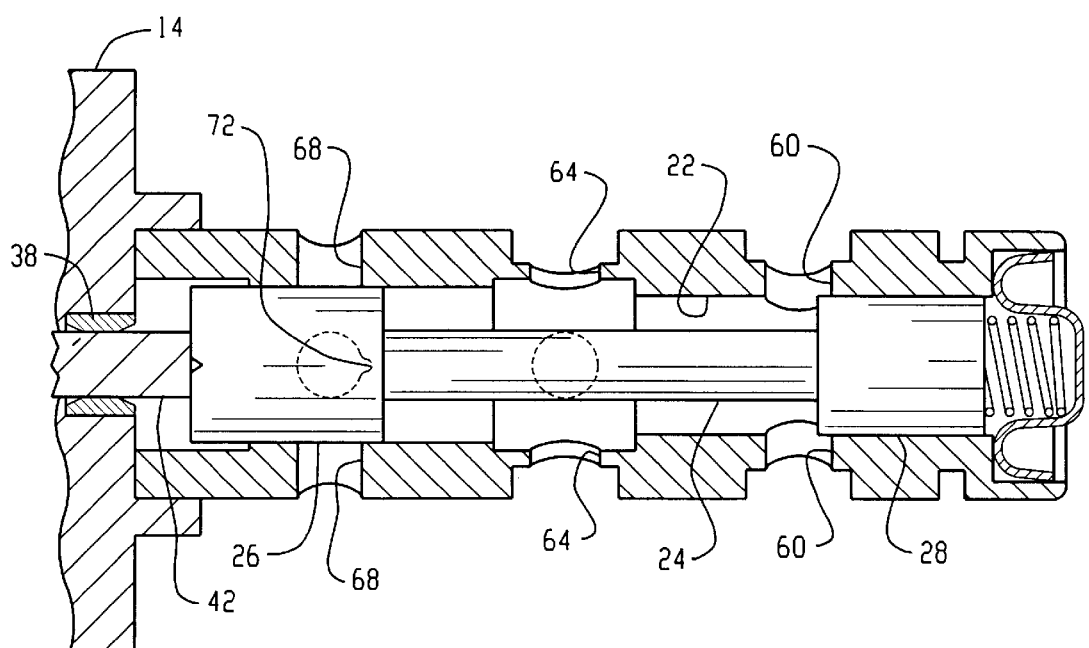
FIG. 6 is a view similar to FIG. 5 showing the valve spool in a high flow position.

Referring to FIG. 6, spool 24 is shown moved to a position where land 26 has closed the exhaust port 60; and, valving land 28 has substantially opened inlet port 60 allowing full flow to the control port 64.

Figure 7:
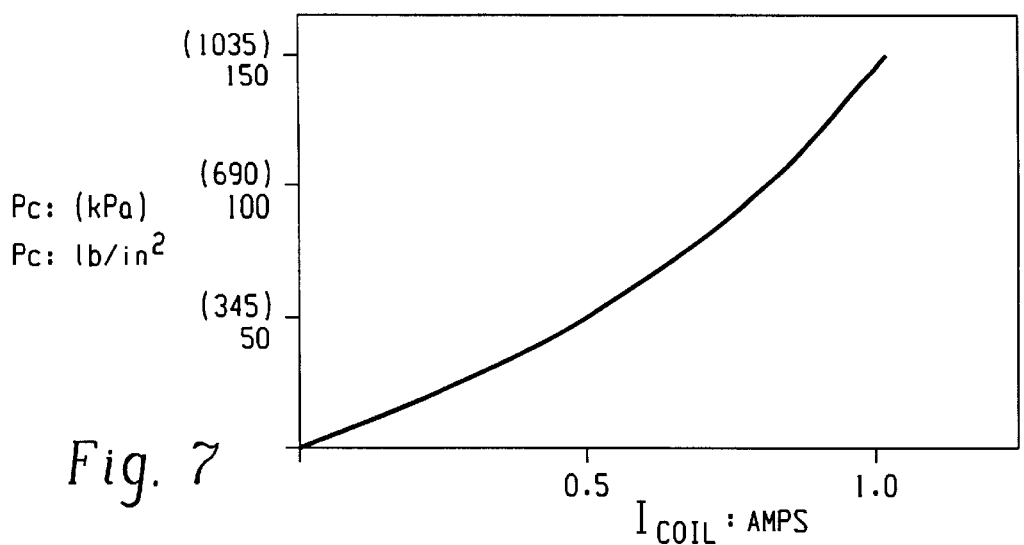
FIG. 7 is a graph of flow pressure at the control outlet plotted as a function of coil currents; and, FIG. 8 is a graph plotted of magnetic force on the armature as a function of armature stroke for a given level of coil current.

Referring to FIG. 7, the pressure piece $P_c$ at the control outlet port 64 is plotted as a function of the coil excitation current $I_c$; and, it will be seen from FIG. 7 that the control pressure in port 64 increases generally proportional with respect to increasing coil current.

Figure 2:
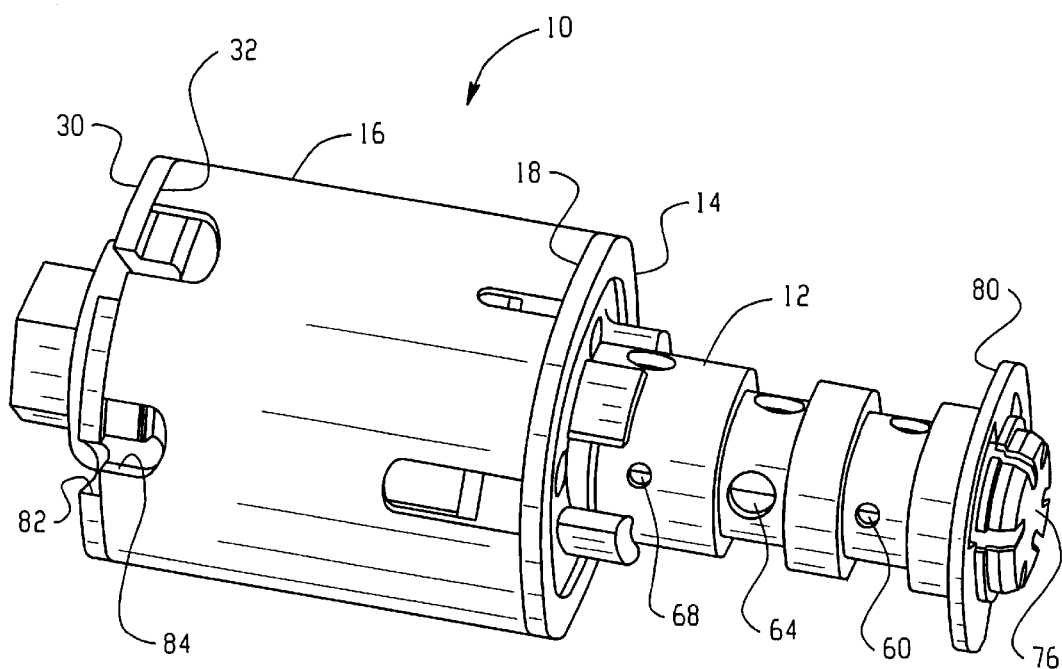
FIG. 2 is a view similar to FIG. 1 taken from the valve body end.
Figure 4:
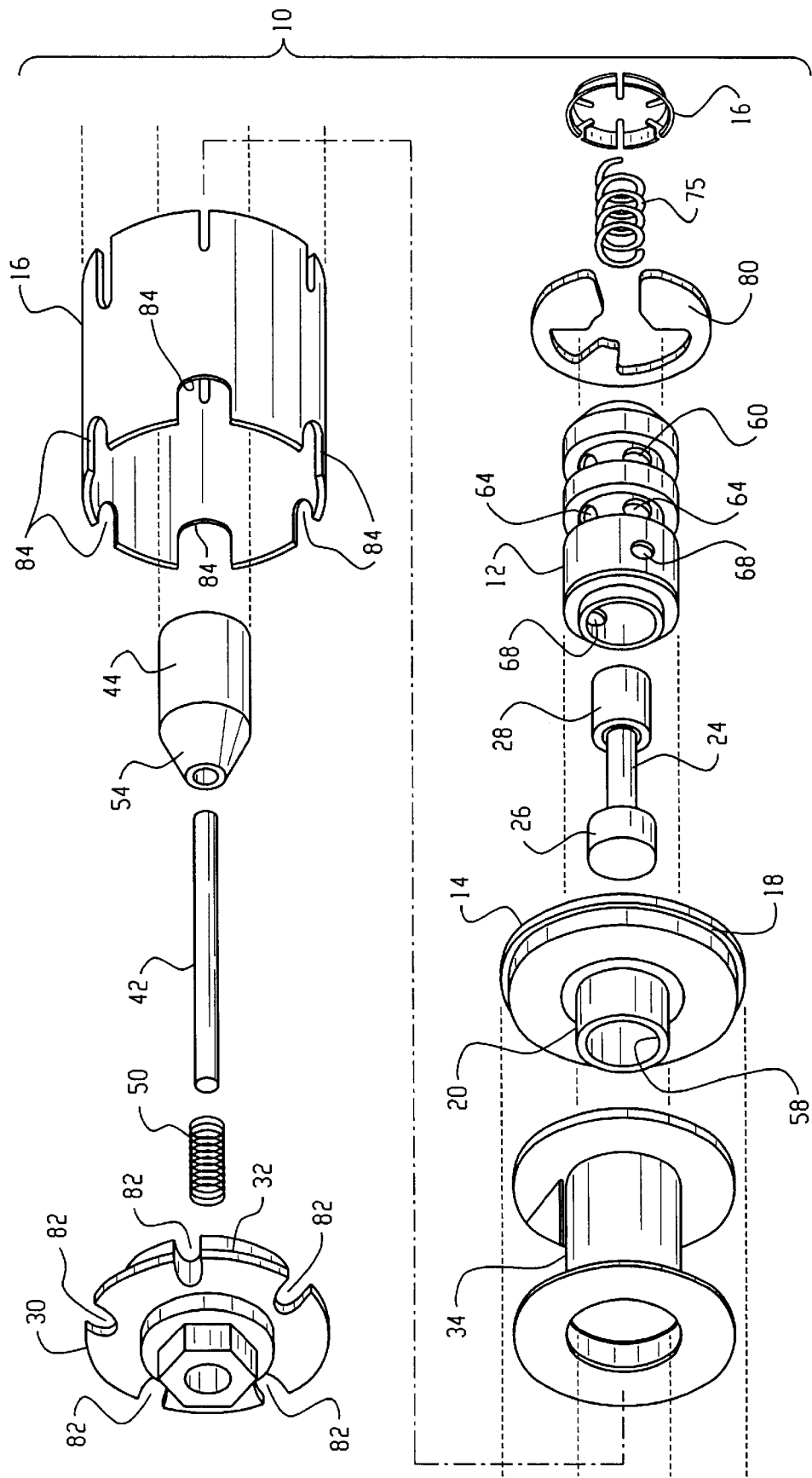
FIG. 4 is an exploded view of valve assembly of FIG. 1.

Referring to FIGS. 1, 2 and 4, the flux collector 30 is shown has having a plurality of peripherally spaced cut-out formed therein which are disposed opposite corresponding cutouts 84 provided in cylindrical shell 16. Flux collector 30 is adjustably rotatable in shell 16 to vary the location of the slots 82, 84 with respect to each other for adjusting the flux nodes created thereby for calibrating armature movement with respect to a given level of coil energization.

It will be understood, that as the armature is attracted to flux collector 30, and the tapered portion 54 of armature 44 closes against the recess 56, the magnetic flux across the tapered air gap increases generally exponentially. However, the reduced area portion 20 of flux collector 14 decreases the flux across the annular air gap at the end of armature 44 opposite taper 54 so as to compensate for the rapid increase in flux at the tapered end of the armature.

It will be understood that if so desired the tapered end of the armature may be alternatively reversed and attracted to the flux collector 14; and, if this alternate arrangement is employed, the tapered recess 56 will be provided in collector 14 if it is desired to reverse the movement of the armature with respect to coil energization for reverse valving movement of spool 24.

Figure 8:
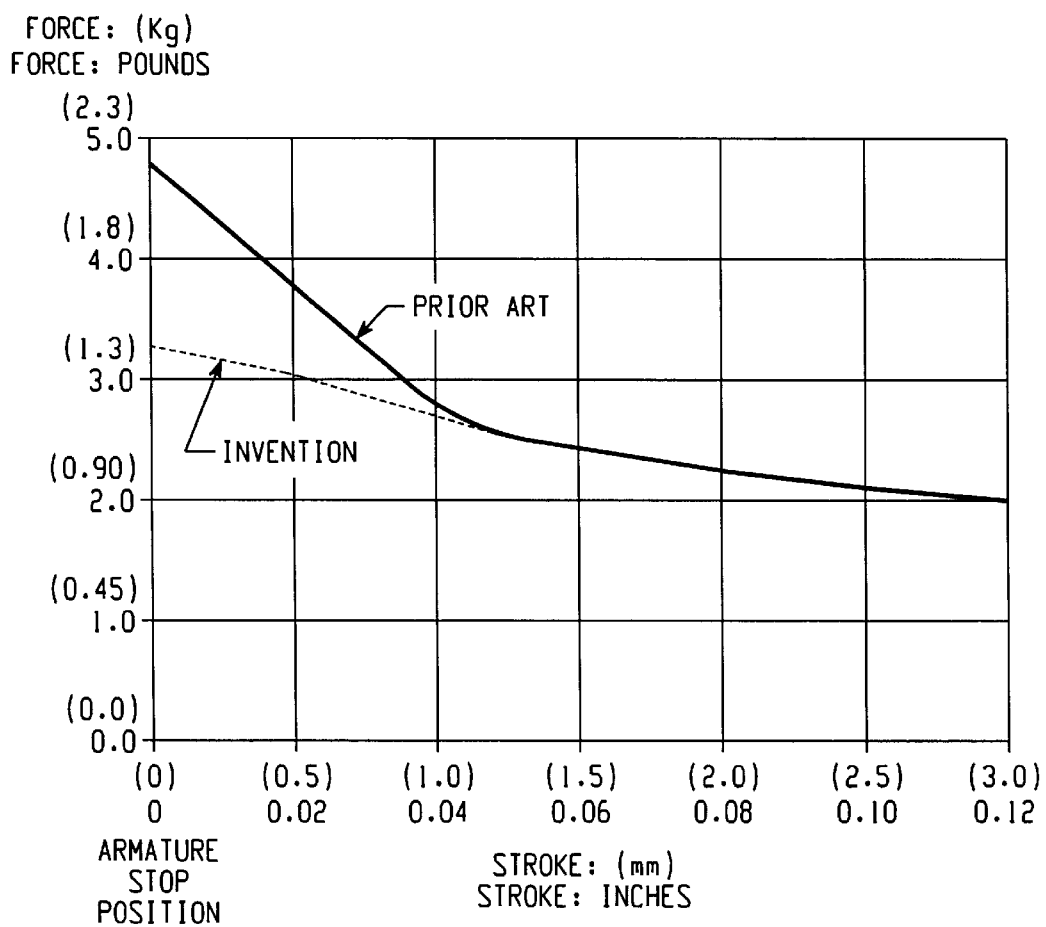

Referring to FIG. 8, the effect of the decreased area of portion 20 of flux collector 14 is illustrated. The force characteristics of the solenoid as a function of armature stroke as shown in graphical representation; and, as illustrated are quite linear and have a sufficiently low slope as to be considered generally constant. The present invention thus permits a longer stroke of the armature for a given coil current and thereby provides for greater flexibility or higher resolution in controlling flow through the valve ports.

Although the invention has hereinabove been described with respect to the illustrated embodiments, it will be understood that the invention is capable of modification and variation and is limited only by the following claims.

What is claimed is:

1. A solenoid operated valve assembly comprising:
    (a) a valve body defining a valving chamber having an inlet port communicating with said chamber and at least one outlet port communicating with said chamber;
    (b) a valve member disposed in said chamber and moveable therein for, upon connection of a source of pressurized fluid to said inlet port, controlling fluid flow from said inlet port to said at least one outlet port;
    (c) a solenoid assembly including an armature guide attached to said valve body and an armature disposed for movement in said guide, wherein movement of said armature is operative for effecting said movement of said valve member;
    (d) a coil disposed about said armature guide and operative upon electrical energization to effect said movement of said armature; and,
    (e) a structure for completing a flux loop around said coil including an outer member and a first flux collector configured to form a working air gap with a first end portion of said armature, and a second flux collector forming an annular air gap with a second end portion of said armature distal said first end portion, said second flux collector having a reduced area portion such that, upon coil energization, and movement of said armature toward said first flux collector, the flux across said annular air gap is progressively reduced by said reduced area portion, thereby minimizing magnetic force increase caused by progressive reduction of said working air gap.

2. The valve assembly defined in claim 1, wherein said reduced area portion of said second flux collector comprises an annular portion of reduced diameter.

3. The valve assembly defined in claim 1, wherein said armature first end has a tapered configuration and said first flux collector includes a recess correspondingly tapered and said first air gap includes an annular tapered portion.

4. The valve assembly defined in claim 1, wherein said outer member includes a plurality of surfaces defining a first set of flux nodes and said first flux collector includes a plurality of surfaces defining a second set of flux nodes, wherein said first flux collector is moveable for adjusting the flux between said first and second set of nodes.

5. The valve assembly defined in claim 1, wherein said valve member comprises a spool and said at least one outlet port includes a first signal outlet port and a second bleed output port.

6. The valve assembly defined in claim 1, wherein said at least one outlet port includes a pressure control outlet port and a bleed outlet port; and said valve member includes a spool having a first land controlling flow to said pressure control outlet and a second land controlling flow to said bleed outlet.

7. The valve assembly defined in claim 1, wherein said outer member includes a generally cylindrical shell.

8. The valve assembly defined in claim 1, wherein said outer member comprises a hollow cylindrical member having a set of flux nodes comprising a plurality of cut-outs on an end thereof.

9. The valve assembly defined in claim 1, wherein said valve body is attached to said second flux collector.

10. A method of making a solenoid operated valve assembly comprising:
    (a) disposing a valve member in a valve body and moving said valve member and controlling flow from an inlet to at least one outlet;
    (b) disposing an armature in a valve guide and operatively connecting said armature for effecting said valve member moving;
    (c) disposing a coil over said armature and armature guide and completing a flux loop about said coil with an outer member and a first flux collector and forming a working air gap between said armature and the first flux collector and disposing a second flux collector spaced from said first flux collector and forming an annular air gap between said armature and said second flux collector;
    (d) forming a reduced area portion on said second flux collector and upon energization of said coil progressively reducing the flux across said second air gap and minimizing the increase in magnetic force as said working air gap is reduced.

11. The method defined in claim 10, wherein said step of forming a reduced area portion includes forming a reduced diameter portion extending in a direction axially with respect to said coil.

12. The method defined in claim 10, wherein said step of completing a flux loop includes forming a first set of flux nodes on said first flux collector and forming a second set of nodes on said outer member and rotating said first flux collector with respect to said outer member and calibrating movement of said armature.

13. The method defined in claim 10, wherein said step of forming a working air gap includes tapering an end of said armature and forming a correspondingly tapered recess in said first flux collector.

\* \* \* \* \*